United States Patent
Hill (10) Patent No.: US 9,755,293 B2
(45) Date of Patent: Sep. 5, 2017

(54) ENHANCED Q HIGH DIELECTRIC CONSTANT MATERIAL FOR MICROWAVE APPLICATIONS

(71) Applicant: SKYWORKS SOLUTIONS, INC., Woburn, MA (US)

(72) Inventor: Michael David Hill, Frederick, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 163 days.

(21) Appl. No.: 14/561,182

(22) Filed: Dec. 4, 2014

(65) Prior Publication Data
US 2015/0158771 A1 Jun. 11, 2015

Related U.S. Application Data

(60) Provisional application No. 61/912,463, filed on Dec. 5, 2013.

(51) Int. Cl.
*H01P 7/10* (2006.01)
*C04B 35/462* (2006.01)

(52) U.S. Cl.
CPC .............. *H01P 7/10* (2013.01); *C04B 35/462* (2013.01); *C04B 2235/3213* (2013.01);
(Continued)

(58) Field of Classification Search
CPC ............ C04B 35/4682; C04B 35/4686; C04B 35/468; C04B 35/478; H01P 1/2084; H01P 1/2086; H01P 7/10; H01P 7/105
(Continued)

(56) References Cited

U.S. PATENT DOCUMENTS 5,556,818 A  9/1996 Kohler et al.
5,824,616 A * 10/1998 Kagata ................. C04B 35/465
                                                      501/136
(Continued)

FOREIGN PATENT DOCUMENTS

EP  2 363 384 A1  9/2011
EP  2 599 761 A1  6/2013
(Continued)

OTHER PUBLICATIONS

R. Guo, "Ferroelectric single crystal materials in optoelectronics and microwave photonic applications", Dec. 1, 2004, IEEE International Topical Meeting on Microwave Photonics—Technical Digest, MWP.*

(Continued)

*Primary Examiner* — Benny Lee
(74) *Attorney, Agent, or Firm* — Chang & Hale LLP (57) ABSTRACT

Enhanced Q high dielectric constant material for microwave applications. In some embodiments, a composition can include a material with a formula $Ba_{4+x}Sm_{(2/3)(14-x+0.5y)}Ti_{18-y}Al_yO_{54}$, with the quantity y being in a range $0<y<2$, and the quantity x being in a range $0<x<2-y$. Such a material can have a dielectric constant value greater than 60 and a Qf value greater than 10,000 at a frequency (f) at or less than 1 GHz. In some embodiments, a material having such properties can be implemented as a ceramic device and be utilized as a dielectric microwave resonator. Such a microwave resonator can be utilized as, for example, a narrow-band radio-frequency (RF) filter.

20 Claims, 4 Drawing Sheets

(52) U.S. Cl.
CPC ............... *C04B 2235/3215* (2013.01); *C04B 2235/3224* (2013.01); *C04B 2235/3227* (2013.01); *C04B 2235/3229* (2013.01); *C04B 2235/3232* (2013.01); *C04B 2235/3262* (2013.01); *C04B 2235/3281* (2013.01); *C04B 2235/3286* (2013.01); *C04B 2235/3287* (2013.01); *C04B 2235/3418* (2013.01); *C04B 2235/76* (2013.01); *C04B 2235/77* (2013.01)

(58) Field of Classification Search
USPC .............................................. 333/219.1, 202
See application file for complete search history.

(56) References Cited

U.S. PATENT DOCUMENTS

| | | |
|---|---|---|
| 6,641,940 B1 | 11/2003 | Li et al. |
| 2003/0164746 A1* | 9/2003 | Kido .................... C04B 35/462 333/219 |
| 2011/0263411 A1 | 10/2011 | Hill |
| 2012/0162319 A1 | 6/2012 | Hayashi et al. |
| 2012/0329635 A1 | 12/2012 | Hill |

FOREIGN PATENT DOCUMENTS

| | | |
|---|---|---|
| JP | 2012 184122 A | 9/2012 |
| WO | 2011/075123 A1 | 6/2011 |
| WO | 2012/082642 A2 | 6/2012 |

OTHER PUBLICATIONS

International Search Report and Written Opinion of the International Searching Authority for PCT/US2014/068949 issued on Mar. 31, 2015.

Makoto Mizuta et al., "Formation of Tungsten Bronze-Type $(Ba_6-3xSm_{8+2x})\alpha Ti_{18-y}Al_yO_{54}(\alpha=1+y/36)$ Solid Solutions and Microwave Dielectric Properties," Japanese Journal of Applied Physics, vol. 35 (1996) pp. 5065-5068 Part 1, No. 9B, Sep. 1996

Extended European Search Report issued on Jun. 29, 2017, for European Patent Application No. 14867767.7, Titled "Enhanced Q High Dielectric Constant Material for Microwave Applications".

* cited by examiner

ENHANCED Q HIGH DIELECTRIC CONSTANT MATERIAL FOR MICROWAVE APPLICATIONS

CROSS-REFERENCE TO RELATED APPLICATION(S)

This application claims priority to U.S. Provisional Application No. 61/912,463 filed Dec. 5, 2013, entitled ENHANCED Q HIGH DIELECTRIC CONSTANT MATERIAL FOR MICROWAVE APPLICATIONS, the disclosure of which is hereby expressly incorporated by reference herein in its entirety.

BACKGROUND

Field

The present disclosure generally relates to high dielectric constant materials for microwave applications.

Description of the Related Art

In some radio-frequency (RF) applications such as microwave applications, ceramic materials are often utilized as, for example, dielectric resonators. Such dielectric resonators can be implemented in devices such as narrowband filters.

SUMMARY OF THE INVENTION

In some implementations, the present disclosure relates to a composition including a material with a formula $Ba_{4+x}Sm_{(2/3)(14-x+0.5y)}Ti_{18-y}Al_yO_{54}$, with the quantity y being in a range $0<y<2$, and the quantity x being in a range $0<x<2-y$.

In some embodiments, the quantity x can be in a range $0<x<1-0.5y$ corresponding to barium content being in a range of 0% to 50%. In some embodiments, the quantity y can be approximately 0.5 and the quantity x can be in a range from approximately 0.01 to approximately 1.0. In some embodiments, the quantity y can be approximately 1.0 and the quantity x can be in a range from approximately 0.01 to approximately 0.5. In some embodiments, the quantity y can be approximately 1.4 and the quantity x can be in a range from approximately 0.01 to approximately 0.3.

In some embodiments, at least some of Sm can be substituted by another lanthanide including La, Ce, Pr, Nd or Gd. In some embodiments, the other lanthanide such as La or Nd can substitute up to approximately 50 atomic percent of Sm.

In some embodiments, at least some of Ba can be substituted by Sr. Sr can substitute up to approximately 30 atomic percent of Ba.

In some embodiments, the composition can further include a minor additive including manganese oxide, manganese carbonate, cerium oxide, copper oxide, germanium oxide, silica or gallium oxide. The minor additive can constitute less than approximately 2 percent by weight. The minor additive can be cerium oxide or manganese oxide; and such a minor additive can constitutes less than 0.5 percent by weight.

In some embodiments, a composition having one or more of the foregoing features can further include a high Q second phase material. The high Q second phase material can include $TiO_2$, $BaTi_4O_9$ or $Ba_2Ti_9O_{20}$.

According to a number of implementations, the present disclosure relates to a dielectric resonator having a ceramic device configured as a microwave resonator. The ceramic device includes a material with a formula $Ba_{4+x}Sm_{(2/3)(14-x+0.5y)}Ti_{18-y}Al_yO_{54}$, with the quantity y being in a range $0<y<2$, and the quantity x being in a range $0<x<2-y$.

In some embodiments, the material can have a dielectric constant value that is greater than 60 for frequencies less than or equal to 1 GHz. Such a dielectric constant value can be in a frequency range that is greater than or equal to 700 MHz and less than or equal to 1 GHz. In some embodiments, the material can have a Qf value that is greater than 10,000, with the quantity Q being a quality factor, and the quantity f being a frequency expressed in GHz.

In accordance with some teachings, the present disclosure relates to a narrowband radio-frequency (RF) filter having an input port and an output port, and one or more dielectric resonators implemented between the input port and the output port. Each of the one or more dielectric resonators includes a ceramic device. The ceramic device includes a material with a formula $Ba_{4+x}Sm_{(2/3)(14-x+0.5y)}Ti_{18-y}Al_yO_{54}$, with the quantity y being in a range $0<y<2$, and the quantity x being in a range $0<x<2-y$.

In a number of implementations, the present disclosure relates to a method for fabricating a tungsten bronze material having titanium (Ti) in a plurality of octahedral sites. The method includes substituting aluminum (Al) for at least some of the titanium (Ti) in the octahedral sites to yield a dielectric constant value greater than 60 and a Qf value greater than 10,000 at a frequency (f) at or less than 1 GHz. The method further includes adjusting contents of rhombic (A1) sites and pentagonal (A2) sites to compensate for charge imbalance resulting from the aluminum substitution of titanium.

In some embodiments, the tungsten bronze material can be represented by a formula $[A2]4[A1]_{10}Ti_{18-y}Al_yO_{54}$. In some embodiments, substantially all of the pentagonal A2 sites can be occupied by barium (Ba) and at least some of the rhombic A1 sites can be occupied by samarium (Sm), such that the adjusting includes adding x formula unit of Ba and $(2/3)x$ formula unit of Sm to the rhombic A1 sites. In some embodiments, the method can further include substituting at least some of the samarium with another lanthanide (Ln) to yield a temperature coefficient of resonant frequency (v) that is less negative.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Disclosed are compositions that can include materials having relatively high dielectric constant values and enhanced Q values. Examples of such materials are described herein in greater detail. Also described herein are examples of how such materials can be manufactured. Also described herein are examples of devices and applications in which such materials can be utilized.

In some radio-frequency (RF) applications such as microwave applications (e.g., low-frequency (700 MHz-1 GHz) applications), materials with a dielectric constant greater than 60 and having a desired or optimized quality factor Q can be desirable. For example, a Qf (product of Q and frequency f) value greater than 10,000 in the foregoing frequency range (700 MHz to 1 GHz range) can be desirable. Further, such a material preferably has a temperature coefficient of resonant frequency that is near zero. Conventional high-dielectric-constant materials typically do not have sufficient Q and/or require expensive raw materials such as gallium (Ga) or germanium (Ge).

Disclosed are various examples of materials that can meet desired Q specifications or requirements without the expensive raw materials in their respective compositions. Also disclosed are examples of how such materials can be implemented in low-frequency microwave applications. Although described in such low-frequency context, it will be understood that one or more features of the present disclosure can also be implemented in other RF applications.

Various examples of dielectric materials and associated methods are described in U.S. Pat. No. 8,318,623 which is expressly incorporated by reference in its entirely and to be considered part of the specification of the present application.

Some compounds with an orthorhombic tungsten bronze structure can be represented by a general formula (1)

where Ln can be a lanthanide such as lanthanum (La), cerium (Ce), praseodymium (Pr), neodymium (Nd), samarium (Sm) or gadolinium (Gd). Such a structure can be implemented for microwave dielectric applications due to their high dielectric constants (e.g., 60-100) and their ability to be tuned to a near zero temperature coefficient of resonant frequency.

In some applications, it is additionally desirable to minimize or reduce the dielectric loss tangent (tan δ) or to maximize or increase the quality factor Q (an inverse of dielectric loss tangent, 1/tan δ) of a dielectric material used for microwave applications, since such a property typically yields sharper resonances and sharper transitions for filter applications.

From a crystallographic perspective, the foregoing materials can be represented as (2)

Typically, the 10 available A1 sites are rhombic while the 4 available A2 sites are pentagonal. The Ti atoms typically occupy octahedral sites. The rhombic A1 sites may be occupied by Ba atoms, Ln atoms, or may be vacant. The pentagonal A2 sites may be occupied by Ba or Ln atoms. Although described in the context of rhombic sites, it will be understood that one or more features of the present disclosure can also be implemented in other types of sites.

For the orthorhombic tungsten bronze structure represented by Formula 1, it is generally understood that the value of Q can be optimal when the quantity x has a value of ⅔ (0.667), where substantially all of the Ba atoms reside in the pentagonal A2 sites and substantially all of the lanthanide (Ln) atoms reside in the rhombic A1 sites. A number of studies have shown that the value of Q is typically maximum when the lanthanide (Ln) chosen is Sm, and decreases with increasing lanthanide size in the order of, for example, Nd, Pr, Ce and La. The Gd material shows a very limited solid solution range and typically yields a relatively low Q as well.

Among the foregoing lanthanide examples, Sm and Gd are lanthanides that yield negative temperature coefficient of resonant frequency ($\tau_f$) values. The other lanthanides Nd, Pr, Ce and La series all yield positive $\tau_f$ values. In the context of dielectric resonators, temperature coefficient of resonant frequency ($\tau_f$) is typically a combination of temperature coefficient of dielectric constant of a resonator, temperature coefficient of the resonator cavity, and the coefficient of thermal expansion of the resonator.

Based on the foregoing properties of the example lanthanides, a typical design strategy can involve blends of two lanthanides such as Sm and Nd or Sm and La to achieve temperature compensated ceramic bodies. Aside from such design considerations based on physical properties, availability and/or cost of raw materials can also impact designs of ceramic devices. For example, there is a demand for ceramic solutions for microwave materials that do not contain scarce and/or costly elements such as neodymium (Nd), gallium (Ga) or germanium (Ge). Samarium (Sm) and lanthanum (La) are significantly less scarce for rare earth elements.

As described in U.S. Pat. No. 8,318,623, as well as in, for example, U.S. Pat. Nos. 5,182,240, 5,185,304 and 5,310,710, at least some of the titanium in tungsten bronze material can be substituted by, for example, aluminum. The resulting charge imbalance can be compensated by adding Ln material (e.g., Nd, a mixture of Nd and Sm, a mixture of Nd and Y, or a mixture of Sm and non-lanthanide Bi) into the vacant rhombic A1 lattice site(s) (e.g., in Formula 2). It is also noted that in the tungsten bronze material of Formula 1 ($Ba_{6-3x}Ln_{8+2x}Ti_{18}O_{54}$), for x values less than or equal to ⅔ where Ln=Nd (in the $BaO$—$Nd_2O_3$—$TiO_2$ ternary system), the resulting phase is chemically compatible with the high Q rutile form of $TiO_2$ (with $\tau_f$ being greater than approximately 500 ppm/° C.).

In some embodiments, aluminum (Al) can be substituted for titanium (Ti) in the octahedral site to yield, contrary to published findings, highest or enhanced Q material at approximately 1 GHz for x values less than or equal to ⅔. In the context of Formula 2, the foregoing substitution of Ti by Al can be represented as $$[A2]_4[A1]_{10}Ti_{18-y}Al_yO_{54}, \qquad (3)$$

where y unit of Ti is substituted by y unit of Al.

As described herein, charge imbalance resulting from substitution of $Ti^{+4}$ with $Al^{+3}$ can be compensated by appropriate occupations of the rhombic A1 and/or pentagonal A2 sites by, for example, $Ln^{+3}$ and/or $Ba^{+2}$, respectively. In the context of such Ln and Ba, Formula 3 can be expressed as a modified form of Formula 1, as one of the following example formulas $$Ba_{6-3x}Ln_{8+2x+(y/3)}Ti_{18-y}Al_yO_{54}, \qquad (4A)$$

$$Ba_{6-3x+(y/2)}Ln_{8+2x}Ti_{18-y}Al_yO_{54}, \text{ and} \qquad (4B)$$

$$Ba_{6-3x-y}Ln_{8+2x+y}Ti_{18-y}Al_yO_{54}, \qquad (4C)$$

where the charge imbalance of y (+4 of Ti to +3 of Al) can be compensated by adding an appropriate amount of Ba (+2), Ln (+3), or a mixture of the two. For example, in Formula 4A, charge balancing can be achieved by adding $Ln^{3+}$, with the formula unit of y/3 to account for the +3 charge. In Formula 4B, charge balancing can be achieved by adding $Ba^{2+}$, with the formula unit of y/2 to account for the +2 charge. In Formula 4C, charge balancing can be achieved by subtracting y formula unit of Ba (+2) and adding y formula unit of Ln (+3). It is noted that Formulas 4A and 4B are extreme cases involving only one type of addition (of Ln or Ba), and that the charge imbalance may also be compensated with a mixture of $Ln^{3+}$ and $Ba^{2+}$ (such as the example of Formula 4C). Previous studies have taught that the Q is optimal only if all of the barium remains on the pentagonal A2 site and the lanthanide remains on the rhombic A1 site. However, the present disclosure shows that such is not necessarily true.

It is noted that in Formula 4, there are 10 available rhombic A1 sites. Accordingly, and in the context of the example of Formula 4A, a limit can be imposed, where formula unit of 8+2x+(y/3) has a maximum value of 10. In such a configuration, the maximum value for y is 2 when x=⅔. In terms of Al substitution of Ti, the maximum amount of aluminum which may be substituted for titanium is 2 formula units (y=2).

Based on the foregoing limit of 2 formula units of aluminum substitution of titanium, aluminum content can be expressed as $$\text{aluminum percent} = 100(y/2), \qquad (5)$$

where y represents the formula units of aluminum in the composition of Formula 4A. For example, when y=2 in which Formula 4A becomes $Ba_4Ln_{10}Ti_{16}Al_2O_{54}$ (with x=⅔), aluminum percent is 100%. In another example, when y=1 and x has a value of ⅔ based on the formula units for barium (6-3x) being equal to 4, Formula 4A becomes $Ba_4Ln_{9.667}Ti_{17}AlO_{54}$, with aluminum percent being 50%. Note that in both cases (of aluminum percent of 100% and 50%), all of the charge compensation for the aluminum substitution comes from adding additional $Ln^{3+}$ to the rhombic A1 site.

In some embodiments, where the compensation of the aluminum substitution at least partially occurs by adding $Ba^{2+}$ to the rhombic A1 site, the maximum amount of barium which can fit into the rhombic A1 site can depend on the foregoing aluminum percent, due to charge balance considerations. The maximum amount of barium which can be placed in the rhombic A1 site ($Ba_{max}$) is equal to 2-(aluminum percent)/50. The barium percent (in the rhombic A1 site) can then be expressed as $(N_{Ba}-4)/Ba_{max}$, where $N_{Ba}$ is the total number of formula units of Ba. Equivalently, barium percent can be expressed as $$\text{barium percent} = (N_{Ba}-4)/(2-(\text{aluminum percent})/50), \qquad (6)$$

where $N_{Ba}$ is the number of barium atoms in the formula (e.g., 6−3x−y in Formula 4). For example, in the case of aluminum percent being 100 (yielding a zero denominator), barium percent is zero, with no barium in the rhombic A1 sites and all of the Ba atoms occupying the pentagonal A2 sites. In another example, the 50%-aluminum configuration that yields the example formula $Ba_4Ln_{9.667}Ti_{17}AlO_{54}$ also results in barium percent of zero, since all of the available aluminum is compensated by additional $Ln^{3+}$ in the rhombic A1 site. Examples of non-zero barium percent configurations are described herein in greater detail.

As described herein in reference to the example of Formula 4C, an aluminum substitution of titanium by an amount of y formula units can be charge-compensated by an addition of lanthanide (by y formula units) and a subtraction of barium (by y formula units). In the context of zero barium percent configurations, a 100%-aluminum configuration can yield $Ba_4Ln_{10}Ti_{16}Al_2O_{54}$, and a 50%-aluminum configuration can yield $Ba_4Ln_{9.667}Ti_{17}AlO_{54}$. In the context of non-zero barium percent configurations, at least some of the barium can occupy the rhombic A1 sites.

In configurations where more than four formula units of barium are present, Formula 4C can be expressed as $$Ba_{4+x'}Ln_{8+2x+y-(2/3)x'}Ti_{18-y}Al_yO_{54}, \qquad (7)$$

where x' represents the additional formula units of barium. Equivalently, x' can be expressed as $x'=N_{Ba}-4$. Such an increase in Ba (+2) can be charge balanced by a decrease of (⅔)x' formula units of Ln(+3). In Formula 7, the aluminum substitution formula unit quantity y can be greater than zero and less than or equal to 2 as described herein, such that 0<y≤2. The extra-barium formula unit x' can be greater than or equal to zero, and less than or equal to a maximum value of 2−y, such that 0≤x'≤2−y. Such a maximum value of 2−y can be calculated by, for example, assuming that the Ln formula unit of 8+2x+y−(⅔)x' (of Formula 7) and the additional Ba formula unit of x' sum to the maximum rhombic A1 site occupation number of 10 (e.g., 8+2x+y−(⅔)x'+x'=10). The quantity x' can be solved to yield x'=2−y.

In some embodiments, all four pentagonal A2 sites can be occupied by barium and the additional x' formula units of barium can occupy rhombic A1 sites. In such embodiments, since all four of the pentagonal A2 sites are occupied by 6−3x−y formula units (barium number in Formula 4C), 6−3x−y can be set to equal 4, which yields an expression x=(⅔)−(⅓)y. Substituting such an expression of x into the subscript of Ln in Formula 7, the subscript becomes 8+2[(⅔)−(⅓)y]+y−(⅔)x', which in turn can be expressed as (⅔)[14+(½)y−x']. Accordingly, Formula 7 can be expressed as $$Ba_{4+x'}Ln_{(2/3)[14+0.5y-x']}Ti_{18-y}Al_yO_{54}, \qquad (8)$$

where the aluminum substitution formula unit quantity y can be greater than zero and less than or equal to 2, such that 0<y≤2. The extra-barium formula unit x' can be greater than or equal to zero, and less than or equal to a maximum value of 1−0.5x, such that 0≤x'≤1−0.5y. Such a maximum value of 1−0.5y can be calculated by, for example, assuming that the Ln formula unit of (⅔)[14+0.5y−x'] (of Formula 8) and the additional Ba formula unit of x' sum to the maximum rhombic A1 site occupation number of 10 (e.g., (⅔)[14+

0.5y−x']+x'=10). The quantity x' can be solved to yield x'=1−0.5y. It is noted that in Formula 8, the four formula units of Ba occupy all of the four pentagonal A2 sites; and such occupation is reflected in the Ln formula unit of (⅔)[14+0.5y−x'].

In embodiments where lanthanide is samarium (Ln=Sm), Formula 8 can be expressed as $$Ba_{4+x}Sm_{(2/3)[14+0.5y-x']}Ti_{18-y}Al_yO_{54}. \quad (9)$$

In such a system, the substitution of aluminum (Al) for titanium (Ti) as described herein can yield high Q rutile form of $TiO_2$ being chemically compatible with Formula 1 $(Ba_{6-3x}Ln_{8+3x}Ti_{18}O_{54})$ when the value of x is less than or equal to ⅔, similar to the foregoing neodymium (Nd) system (Ln=Nd). In some embodiments of the Sm system, one or more lanthanides having positive $\tau_f$ values can be introduced to compensate for the negative $\tau_f$ value associated with Sm. For example, some of Sm can be substituted by another lanthanide such as La, Ce, Pr, Nd or Gd. In some embodiments, the other lanthanide can be La or Nd, and such lanthanide can substitute up to approximately 50 percent (e.g., mole %) of Sm.

Although various examples are described in the context of barium, it will be understood that one or more of other alkaline earth metals can replace at least some of the barium content. For example, strontium (Sr) can be included, and its content percent can be calculated in the same manner as the barium percent described herein in reference to Equation 6.

In some embodiments having x values <0.667 in, for example Formula 4, there may be conditions where rutile $TiO_2$ can be added as a second crystallographic phase. Examples of such additions are described herein in greater detail. Further, some embodiments can include small amounts of acceptor dopants such as $MnO_2$ or $CeO_2$ added to the composition to, for example, prevent or reduce thermal reduction of the titanium from $Ti^{4+}$ to $Ti^{3+}$.

Table 1 lists various samples having various combinations of aluminum percent (Al %, as described in Equation 5), barium percent (Ba %, as described in Equation 6), strontium percent (Sr %, similar to the barium percent), lanthanum percent (La %, mole percent), cerium oxide weight percent ($CeO_2$ w %), and titanium oxide or rutile weight percent ($TiO_2$ w %). Table 1 also lists density values of selected ones of the samples. Empty cells, if any, correspond to values that are either not applicable or not available. It will be understood that each of the samples listed in Table 1 is based on Formula 9 $(Ba_{4+x}Sm_{(2/3)[14+0.5y-x']}Ti_{18-y}Al_yO_{54})$, with the various percent values corresponding to substitutions of Ba or Sm, or introduction of second phase materials (e.g., $TiO_2$).

Table 2 lists Q values for the same samples of Table 1, at or near f=1 GHz. Corresponding Qf values are also listed. Table 2 also lists dielectric constant values (∈') corresponding to the listed approximately 1 GHz frequency values for selected ones of the samples. Table 2 also lists values of temperature coefficient of resonant frequency ($\tau_f$) for selected ones of the samples. Empty cells, if any, correspond to values that are either not applicable or not available. For example, in Table 2, Sample Nos. 14, 15, 27, 29, 113, 115, 116 and 125 are samples for which various corresponding parameters are either not applicable or not available.

Table 3 lists Q values for some of the samples of Table 1, at or near f=3 GHz. Corresponding Qf values are also listed. Table 3 also lists dielectric constant values (∈') corresponding to the listed approximately 3 GHz frequency values. Empty cells, if any, correspond to values that are either not applicable or not available.

TABLE 1

| Sample No. | Al % | Ba % | Sr % | La % | $CeO_2$ w % | $TiO_2$ w % | Density (g/cm³) |
|---|---|---|---|---|---|---|---|
| 1  | 100  | 0     | 0 | 2.75  | 0     | 0    |       |
| 2  | 100  | 0     | 0 | 2.75  | 0     | 0    |       |
| 3  | 100  | 0     | 0 | 2.75  | 0     | 0    |       |
| 4  | 100  | 0     | 0 | 2.75  | 0     | 0    |       |
| 5  | 100  | 0     | 0 | 2.75  | 0     | 0    |       |
| 6  | 100  | 0     | 0 | 2.75  | 0     | 0    |       |
| 7  | 100  | 0     | 0 | 2.75  | 0     | 0    |       |
| 8  | 75   | 0     | 0 | 0     | 0     | 0    |       |
| 9  | 75.1 | 24.8  | 0 | 0     | 0     | 0    |       |
| 10 | 50   | 0     | 0 | 0     | 0     | 0    |       |
| 11 | 50   | 25    | 0 | 0     | 0     | 0    |       |
| 12 | 25   | 0     | 0 | 0     | 0     | 0    |       |
| 13 | 24.9 | 24.9  | 0 | 0     | 0     | 0    |       |
| 14 | 0    | 0     | 0 | 0     | 0     | 25   |       |
| 15 | 0    | 25.1  | 0 | 0     | 0     | 25   |       |
| 16 | 75   | 25    | 0 | 0     | 0     | 25   |       |
| 17 | 50   | 0     | 0 | 0     | 0     | 25   |       |
| 18 | 50   | 25    | 0 | 0     | 0     | 25   |       |
| 19 | 25   | 0     | 0 | 0     | 0     | 25   |       |
| 20 | 25   | 25    | 0 | 0     | 0     | 25   |       |
| 21 | 25   | 0     | 0 | 0     | 0     | 12.5 |       |
| 22 | 25   | 25    | 0 | 0     | 0     | 12.5 |       |
| 23 | 75.1 | 24.8  | 0 | 0     | 0.25  | 0    | 5.453 |
| 24 | 50   | 25    | 0 | 0     | 0.5   | 0    |       |
| 25 | 24.9 | 24.9  | 0 | 0     | 0.75  | 0    |       |
| 26 | 0    | 25.1  | 0 | 0     | 0.75  | 25   |       |
| 27 | 0    | 25.1  | 0 | 0     | 0.875 | 12.5 |       |
| 28 | 24.9 | 24.9  | 0 | 0     | 0.558 | 25   |       |
| 29 | 24.9 | 24.9  | 0 | 0     | 0.658 | 12.5 |       |
| 30 | 74.2 | 48.06 | 0 | 2.8   | 0.25  | 0    | 5.896 |
| 31 | 49.85| 25.09 | 0 | 5.78  | 0.5   | 0    |       |
| 32 | 24.98| 24.91 | 0 | 8.89  | 0.75  | 0    |       |
| 33 | 0    | 24.92 | 0 | 12.14 | 0.875 | 0    |       |
| 34 | 24.98| 24.91 | 0 | 8.89  | 0.75  | 25   |       |

TABLE 1-continued

| Sample No. | Al % | Ba % | Sr % | La % | CeO$_2$ w % | TiO$_2$ w % | Density (g/cm$^3$) |
|---|---|---|---|---|---|---|---|
| 35 | 24.98 | 24.91 | 0 | 8.89 | 0.75 | 12.5 | |
| 36 | 74.75 | 25.34 | 0 | 2.84 | 0 | 0 | 5.916 |
| 37 | 49.68 | 24.91 | 0 | 5.82 | 0 | 0 | |
| 38 | 24.67 | 24.8 | 0 | 8.92 | 0 | 0 | |
| 39 | 0 | 24.92 | 0 | 12.14 | 0 | 25 | |
| 40 | 0 | 24.92 | 0 | 12.14 | 0 | 12.5 | |
| 41 | 24.67 | 24.8 | 0 | 8.92 | 0 | 25 | |
| 42 | 24.67 | 24.8 | 0 | 8.92 | 0 | 12.5 | |
| 43 | 9.93 | 24.9 | 0 | 5 | 0 | 0 | |
| 44 | 9.93 | 25.1 | 0 | 10 | 0 | 0 | |
| 45 | 31.28 | 24.88 | 0 | 5 | 0 | 0 | |
| 46 | 31.28 | 24.88 | 0 | 10 | 0 | 0 | |
| 47 | 50.02 | 24.84 | 0 | 5 | 0 | 0 | |
| 48 | 50.02 | 24.84 | 0 | 10 | 0 | 0 | |
| 49 | 70.07 | 25 | 0 | 5 | 0 | 0 | 5.74 |
| 50 | 70.07 | 25 | 0 | 10 | 0 | 0 | |
| 51 | 89.95 | 25.87 | 0 | 5 | 0 | 0 | |
| 52 | 89.95 | 25.87 | 0 | 10 | 0 | 0 | |
| 53 | 9.93 | 24.9 | 0 | 2.5 | 0 | 0 | |
| 54 | 31.28 | 24.88 | 0 | 2.5 | 0 | 0 | |
| 55 | 50.02 | 24.84 | 0 | 2.5 | 0 | 0 | 5.76 |
| 56 | 70.07 | 25 | 0 | 2.5 | 0 | 0 | 5.74 |
| 57 | 89.95 | 25.87 | 0 | 2.5 | 0 | 0 | |
| 58 | 10 | 31.99 | 0 | 5 | 0 | 0 | |
| 59 | 10 | 31.99 | 0 | 10 | 0 | 0 | |
| 60 | 29.8 | 33.8 | 0 | 5 | 0 | 0 | |
| 61 | 29.8 | 33.8 | 0 | 10 | 0 | 0 | |
| 62 | 49.6 | 37.06 | 0 | 5 | 0 | 0 | |
| 63 | 49.6 | 37.06 | 0 | 10 | 0 | 0 | |
| 64 | 69.4 | 45.02 | 0 | 5 | 0 | 0 | 5.7 |
| 65 | 69.4 | 45.02 | 0 | 10 | 0 | 0 | 5.7 |
| 66 | 89.23 | 82.2 | 0 | 5 | 0 | 0 | 5.64 |
| 67 | 89.23 | 82.2 | 0 | 10 | 0 | 0 | 5.66 |
| 68 | 10 | 31.99 | 0 | 2.5 | 0 | 0 | |
| 69 | 29.8 | 33.8 | 0 | 2.5 | 0 | 0 | |
| 70 | 49.6 | 37.06 | 0 | 2.5 | 0 | 0 | |
| 71 | 69.4 | 45.02 | 0 | 2.5 | 0 | 0 | 5.75 |
| 72 | 89.23 | 82.2 | 0 | 2.5 | 0 | 0 | 5.67 |
| 73 | 74.2 | 48 | 0 | 10 | 0 | 0 | 5.77 |
| 74 | 74.2 | 48 | 0 | 10 | 0 | 10 | |
| 75 | 74.2 | 0 | 48 | 10 | 0 | 0 | 5.81 |
| 76 | 74.2 | 48 | 0 | 20 | 0 | 0 | 5.78 |
| 77 | 74.2 | 48 | 0 | 30 | 0 | 0 | 5.77 |
| 78 | 74.2 | 48 | 0 | 40 | 0 | 0 | 5.67 |
| 79 | 74.75 | 25.35 | 0 | 10 | 0 | 0 | 5.8 |
| 80 | 74.75 | 25.35 | 0 | 10 | 0 | 10 | |
| 81 | 74.75 | 0 | 25.35 | 10 | 0 | 0 | 5.8 |
| 82 | 74.75 | 25.35 | 0 | 20 | 0 | 0 | 5.79 |
| 83 | 74.75 | 25.35 | 0 | 30 | 0 | 0 | 5.77 |
| 84 | 74.75 | 25.35 | 0 | 40 | 0 | 0 | 5.71 |
| 85 | 70.06 | 25 | 0 | 10 | 0 | 0 | 5.76 |
| 86 | 70.06 | 25 | 0 | 10 | 0 | 10 | |
| 87 | 70.06 | 0 | 25 | 10 | 0 | 0 | 5.82 |
| 88 | 70.06 | 25 | 0 | 20 | 0 | 0 | 5.66 |
| 89 | 70.06 | 25 | 0 | 30 | 0 | 0 | 5.73 |
| 90 | 70.06 | 25 | 0 | 40 | 0 | 0 | 5.73 |
| 91 | 89.25 | 82.3 | 0 | 10 | 0 | 0 | |
| 92 | 89.25 | 82.3 | 0 | 10 | 0 | 10 | |
| 93 | 89.25 | 0 | 82.3 | 10 | 0 | 0 | |
| 94 | 89.25 | 82.3 | 0 | 20 | 0 | 0 | |
| 95 | 89.25 | 82.3 | 0 | 30 | 0 | 0 | |
| 96 | 89.25 | 82.3 | 0 | 40 | 0 | 0 | |
| 97 | 69.35 | 45 | 0 | 10 | 0 | 0 | 5.76 |
| 98 | 69.35 | 45 | 0 | 10 | 0 | 10 | |
| 99 | 69.35 | 0 | 45 | 10 | 0 | 0 | 5.79 |
| 100 | 69.35 | 45 | 0 | 20 | 0 | 0 | 5.73 |
| 101 | 69.35 | 45 | 0 | 30 | 0 | 0 | 5.76 |
| 102 | 69.35 | 45 | 0 | 40 | 0 | 0 | 5.64 |
| 103 | 50 | 0 | 0 | 5 | 0 | 0 | |
| 104 | 50 | 0 | 0 | 5 | 0 | 10 | |
| 105 | 50 | 12.5 | 0 | 5 | 0 | 0 | |
| 106 | 50 | 12.5 | 0 | 5 | 0 | 10 | |
| 107 | 50 | 25 | 0 | 5 | 0 | 0 | |
| 108 | 50 | 25 | 0 | 5 | 0 | 10 | |
| 109 | 50 | 37.5 | 0 | 5 | 0 | 0 | |
| 110 | 50 | 37.5 | 0 | 5 | 0 | 10 | |
| 111 | 50 | 50 | 0 | 5 | 0 | 0 | |

TABLE 1-continued

| Sample No. | Al % | Ba % | Sr % | La % | CeO₂ w % | TiO₂ w % | Density (g/cm³) |
|---|---|---|---|---|---|---|---|
| 112 | 50 | 50 | 0 | 5 | 0 | 10 | |
| 113 | 50 | 75 | 0 | 5 | 0 | 0 | |
| 114 | 50 | 75 | 0 | 5 | 0 | 10 | |
| 115 | 50 | 100 | 0 | 5 | 0 | 0 | |
| 116 | 50 | 100 | 0 | 5 | 0 | 10 | |
| 117 | 66.67 | 0 | 0 | 5 | 0 | 0 | |
| 118 | 66.67 | 0 | 0 | 5 | 0 | 10 | |
| 119 | 66.67 | 25 | 0 | 5 | 0 | 0 | |
| 120 | 66.67 | 25 | 0 | 5 | 0 | 10 | |
| 121 | 66.67 | 50 | 0 | 5 | 0 | 0 | |
| 122 | 66.67 | 50 | 0 | 5 | 0 | 10 | |
| 123 | 66.67 | 75 | 0 | 5 | 0 | 0 | |
| 124 | 66.67 | 75 | 0 | 5 | 0 | 10 | |
| 125 | 66.67 | 100 | 0 | 5 | 0 | 0 | |
| 126 | 66.67 | 100 | 0 | 5 | 0 | 10 | |
| 127 | 83.33 | 50 | 0 | 5 | 0 | 10 | |
| 128 | 83.33 | 100 | 0 | 5 | 0 | 0 | |
| 129 | 83.33 | 100 | 0 | 5 | 0 | 10 | |
| 130 | 70.06 | 25 | 0 | 40 | 0 | 0 | |
| 131 | 70.06 | 25 | 0 | 40 | 0.067 | 0 | |
| 132 | 70.06 | 25 | 0 | 40 | 0.033 | 0 | |
| 133 | 70.06 | 25 | 0 | 40 | 0.067 | 0 | |
| 134 | 70.06 | 25 | 0 | 40 | 0 | 0 | |
| 135 | 70.06 | 25 | 0 | 40 | 0.133 | 0 | |
| 136 | 50 | 20 | 0 | 0 | 0 | 8.333 | |
| 137 | 50 | 20 | 0 | 0 | 0.067 | 8.333 | |
| 138 | 50 | 20 | 0 | 0 | 0.067 | 8.333 | |
| 139 | 25 | 25 | 0 | 0 | 0 | 8.333 | |
| 140 | 25 | 25 | 0 | 0 | 0.067 | 8.333 | 5.61 |
| 141 | 25 | 25 | 0 | 0 | 0.033 | 8.333 | 5.61 |
| 142 | 25 | 25 | 0 | 0 | 0.067 | 8.333 | |
| 143 | 25 | 25 | 0 | 10 | 0 | 8.333 | |
| 144 | 25 | 25 | 0 | 10 | 0.067 | 8.333 | |
| 145 | 25 | 25 | 0 | 10 | 0.033 | 8.333 | |
| 146 | 25 | 25 | 0 | 10 | 0.067 | 8.333 | |
| 147 | 50 | 27 | 0 | 0 | 0.067 | 10 | |
| 148 | 50 | 29 | 0 | 0 | 0.067 | 10 | |
| 149 | 50 | 31 | 0 | 0 | 0.067 | 10 | |
| 150 | 50 | 33 | 0 | 0 | 0.067 | 10 | |
| 151 | 50 | 35 | 0 | 0 | 0.067 | 10 | |
| 152 | 50 | 37 | 0 | 0 | 0.067 | 10 | |
| 153 | 50 | 39 | 0 | 0 | 0.067 | 10 | |
| 154 | 50 | 41 | 0 | 0 | 0.067 | 10 | |
| 155 | 50 | 43 | 0 | 0 | 0.067 | 10 | |
| 156 | 50 | 45 | 0 | 0 | 0.067 | 10 | |
| 157 | 70.06 | 25 | .3GeO2 | 0 | .067MnO2 | 0 | |
| 158 | 70.06 | 25 | .3GeO2 | 0 | 0.067 | 0 | |
| 159 | 70.06 | 25 | .3GeO2 | 40 | .067MnO2 | 0 | |
| 160 | 70.06 | 25 | .3GeO2 | 40 | 0.067 | 0 | |
| 161 | 70.06 | 25 | 0 | 50Nd2O3 | 0.067 | 0 | |
| 162 | 70.06 | 25 | 0 | 50Nd2O3 | .067MnO2 | 0 | |
| 163 | 70.06 | 25 | .3GeO2 | 50Nd2O3 | 0.067 | 0 | |
| 164 | 70.06 | 25 | .3GeO2 | 50Nd2O3 | .067MnO2 | 0 | |
| 165 | 25 | 25 | .3GeO2 | 0 | 0.067 | 10 | |
| 166 | 25 | 25 | .3GeO2 | 10 | 0.067 | 10 | |
| 167 | 25 | 25 | 0 | 10Nd2O3 | 0.067 | 0 | |
| 168 | 25 | 25 | .3GeO2 | 10Nd2O3 | 0.067 | 0 | |
| 169 | 25 | 25 | 0 | 50Nd2O3 | 0.067 | 0 | |
| 170 | 25 | 25 | .3GeO2 | 50Nd2O3 | 0.067 | 0 | |

TABLE 2

| Sample No. | Q (1 GHz) | f | Qf (1 GHz) | ∈' (1 GHz) | τ_F |
|---|---|---|---|---|---|
| 1 | 2170 | 1.156 | 2508.52 | | |
| 2 | 3170 | 1.172 | 3715.24 | | |
| 3 | 3420 | 1.111 | 3799.62 | | |
| 4 | 6580 | 1.089 | 7165.62 | | |
| 5 | 4770 | 1.045 | 4984.65 | | |
| 6 | 7300 | 1.013 | 7394.9 | | |
| 7 | 7830 | 0.949 | 7430.67 | | |
| 8 | 2620 | 1.092 | 2861.04 | | |
| 9 | 9510 | 1.104 | 10499.04 | | |
| 10 | 3600 | 1.054 | 3794.4 | | |
| 11 | 6720 | 1.052 | 7069.44 | | |
| 12 | 4410 | 1.016 | 4480.56 | | |
| 13 | 3600 | 1.0528 | 3790.08 | 81.8 | |
| 14 | | | | | |
| 15 | | | | | |
| 16 | 1000 | 0.98 | 980 | 82 | |
| 17 | 1500 | 0.9543 | 1431.45 | 81.9 | |
| 18 | 4780 | 0.974 | 4655.72 | | |
| 19 | 1400 | 0.9484 | 1327.76 | 84.2 | |
| 20 | 1500 | 0.9805 | 1470.75 | 79.7 | |

TABLE 2-continued

| Sample No. | Q (1 GHz) | f | Qf (1 GHz) | $\in'$ (1 GHz) | $\tau_F$ |
|---|---|---|---|---|---|
| 21 | 1000 | 0.9929 | 992.9 | 78.4 | |
| 22 | 1400 | 1.026 | 1436.4 | 73.8 | |
| 23 | 9700 | 1.1895 | 11538.15 | | -41.61 |
| 24 | 8000 | 1.0859 | 8687.2 | 68.3 | |
| 25 | 2500 | 1.0306 | 2576.5 | 76.6 | |
| 26 | 3900 | 1.0723 | 4181.97 | 76.7 | |
| 27 | | | | | |
| 28 | 1000 | 0.9966 | 996.6 | 77.1 | |
| 29 | | | | | |
| 30 | 12000 | 1.0818 | 12981.6 | 63.1 | -62.53 |
| 31 | 9400 | 1.0363 | 9741.22 | | |
| 32 | 9900 | 1.0109 | 10007.91 | | |
| 33 | 5200 | 1.0903 | 5669.56 | | |
| 34 | 5000 | 1.2524 | 6262 | | |
| 35 | 3800 | 1.3473 | 5119.74 | | |
| 36 | 11000 | 1.0839 | 11922.9 | 66 | -61.19 |
| 37 | 9600 | 1.0446 | 10028.16 | | |
| 38 | 8000 | 0.9915 | 7932 | | |
| 39 | 6000 | 1.0312 | 6187.2 | | |
| 40 | 6300 | 1.0055 | 6334.65 | | |
| 41 | 8000 | 1.1036 | 8828.8 | | |
| 42 | 8000 | 1.0685 | 8548 | | |
| 43 | 7680 | 0.9718 | 7463.424 | | |
| 44 | 7668 | 0.9669 | 7414.1892 | | |
| 45 | 8742 | 1.0128 | 8853.8976 | | |
| 46 | 8734 | 1.0081 | 8804.7454 | | |
| 47 | 9910 | 1.0601 | 10505.591 | | |
| 48 | 9696 | 1.0502 | 10182.739 | | |
| 49 | 10923 | 1.0876 | 11879.855 | | -55.32 |
| 50 | 10580 | 1.0904 | 11536.432 | | -48.21 |
| 51 | 4352 | 1.1621 | 5057.4592 | | |
| 52 | 7031 | 1.2009 | 8443.5279 | | |
| 53 | 7079 | 1.0114 | 7159.7006 | | |
| 54 | 7885 | 1.1273 | 8888.7605 | | |
| 55 | 10224 | 1.0482 | 10716.797 | | -46.15 |
| 56 | 10780 | 1.1261 | 12139.358 | | -57.93 |
| 57 | 3674 | 1.1532 | 4236.8568 | | |
| 58 | 3556 | 0.9687 | 3444.6972 | | |
| 59 | 4647 | 0.9609 | 4465.3023 | | |
| 60 | 7770 | 1.0052 | 7810.404 | | |
| 61 | 7948 | 1.0043 | 7982.1764 | | |
| 62 | 9417 | 1.0411 | 9804.0387 | | |
| 63 | 9302 | 1.0517 | 9782.9134 | | |
| 64 | 10341 | 1.0823 | 11192.064 | | -54.1 |
| 65 | 10018 | 1.0909 | 10928.636 | | -46.83 |
| 66 | 10860 | 1.1288 | 12258.768 | | -62.16 |
| 67 | 10445 | 1.1151 | 11647.22 | | -55.87 |
| 68 | 2653 | 0.9673 | 2566.2469 | | |
| 69 | 6935 | 1.0049 | 6968.9815 | | |
| 70 | 9223 | 1.0384 | 9577.1632 | | |
| 71 | 10003 | 1.1293 | 11296.388 | | -58.02 |
| 72 | 11197 | 1.1336 | 12692.919 | | -65.23 |
| 73 | 9700 | 1.0987 | 10657.39 | 65.5 | -50.34 |
| 74 | 4500 | 1.1571 | 5206.95 | 69.8 | |
| 75 | 9300 | 1.0991 | 10221.63 | 66.3 | -51.46 |
| 76 | 9400 | 1.1015 | 10354.1 | 67.8 | -32.96 |
| 77 | 8200 | 1.0835 | 8884.7 | 69.5 | -12.82 |
| 78 | 6600 | 1.1135 | 7349.1 | 70.5 | 15.09 |
| 79 | 10600 | 1.1003 | 11663.18 | 66 | -52.13 |
| 80 | 3600 | 1.0643 | 3831.48 | 67.1 | |
| 81 | 8800 | 1.1149 | 9811.12 | 65.8 | -53.34 |
| 82 | 9800 | 1.09 | 10682 | 67.5 | -36.93 |
| 83 | 8800 | 1.0905 | 9596.4 | 68.8 | -16.24 |
| 84 | 7400 | 1.0616 | 7855.84 | 69.9 | 7.33 |
| 85 | 10300 | 1.1232 | 11568.96 | 65.8 | -48.71 |
| 86 | 4300 | 1.0486 | 4508.98 | 69.3 | |
| 87 | 8700 | 1.1725 | 10200.75 | 67 | -51.36 |
| 88 | 10400 | 1.0536 | 10957.44 | 65.5 | -32.12 |
| 89 | 9000 | 1.045 | 9405 | 68.9 | -14.01 |
| 90 | 7600 | 1.0537 | 8008.12 | 71.9 | 9.81 |
| 91 | 9200 | 1.2902 | 11869.84 | 61.2 | |
| 92 | 2600 | 1.088 | 2828.8 | 64.1 | |
| 93 | 8000 | 1.1366 | 9092.8 | 61.5 | |
| 94 | 9200 | 1.1044 | 10160.48 | 61.9 | |
| 95 | 7500 | 1.1018 | 8263.5 | 62.8 | |
| 96 | 6000 | 1.1165 | 6699 | 62.8 | |
| 97 | 10000 | 1.0912 | 10912 | 66.9 | -47.17 |
| 98 | 4800 | 1.0472 | 5026.56 | 71.9 | |
| 99 | 9400 | 1.0952 | 10294.88 | 67.8 | -49.31 |
| 100 | 9500 | 1.0742 | 10204.9 | 68.1 | -29.03 |
| 101 | 8400 | 1.0607 | 8909.88 | 70.9 | -8.75 |
| 102 | 6800 | 1.0476 | 7123.68 | 71.2 | 20.57 |
| 103 | 4300 | 1.0483 | 4507.69 | 70.8 | |
| 104 | 2500 | 1.0174 | 2543.5 | 73.9 | |
| 105 | 10300 | 1.0656 | 10975.68 | 68.7 | |
| 106 | 2700 | 1.0132 | 2735.64 | 75.6 | |
| 107 | 9850 | 1.0651 | 10491.235 | 69.2 | |
| 108 | 7000 | 1.0099 | 7069.3 | 75.7 | |
| 109 | 9000 | 1.0788 | 9709.2 | 70.1 | |
| 110 | 6800 | 1.0302 | 7005.36 | 73.6 | |
| 111 | 2000 | 1.0491 | 2098.2 | 71.9 | |
| 112 | 4800 | 1.1632 | 5583.36 | 55 | |
| 113 | | | | | |
| 114 | 5700 | 1.0687 | 6091.59 | 66 | |
| 115 | | | | | |
| 116 | | | | | |
| 117 | 4200 | 1.0897 | 4576.74 | 67.4 | |
| 118 | 5600 | 1.0445 | 5849.2 | 67.3 | |
| 119 | 10600 | 1.102 | 11681.2 | 65.5 | |
| 120 | 1600 | 1.0285 | 1645.6 | 71.4 | |
| 121 | 9700 | 1.102 | 10689.4 | 66.5 | |
| 122 | 3200 | 1.0222 | 3271.04 | 72.5 | |
| 123 | 1000 | 1.0881 | 1088.1 | 68.4 | |
| 124 | 5100 | 1.0373 | 5290.23 | 68.2 | |
| 125 | | | | | |
| 126 | 4900 | 1.0799 | 5291.51 | 63.4 | |
| 127 | 1600 | 1.0603 | 1696.48 | 66.7 | |
| 128 | 1600 | 1.1628 | 1860.48 | 61.7 | |
| 129 | 3700 | 1.0604 | 3923.48 | 67.4 | |
| 130 | 6600 | 1.0502 | 6931.32 | 71.1 | |
| 131 | 6900 | 1.0722 | 7398.18 | 71.1 | |
| 132 | 6900 | 1.0661 | 7356.09 | 71.2 | |
| 133 | 6800 | 1.0789 | 7336.52 | 71.4 | |
| 134 | 6100 | 1.0704 | 6529.44 | 71.5 | |
| 135 | 7000 | 1.0816 | 7571.2 | 69.6 | |
| 136 | 6900 | 1.0419 | 7189.11 | 73.4 | |
| 137 | 7300 | 1.037 | 7570.1 | 73.4 | |
| 138 | 6900 | 1.0293 | 7102.17 | 72.9 | |
| 139 | 8800 | 1.0313 | 9075.44 | 72.9 | |
| 140 | 9900 | 1.0287 | 10184.13 | 72.9 | -2.6 |
| 141 | 9900 | 1.0244 | 10141.56 | 73 | -1.86 |
| 142 | 9600 | 1.0327 | 9913.92 | 72.7 | |
| 143 | 8000 | 1.0281 | 8224.8 | 74.6 | |
| 144 | 8600 | 1.0266 | 8828.76 | 74.4 | |
| 145 | 8200 | 1.0362 | 8496.84 | 74.4 | |
| 146 | 7900 | 1.0366 | 8189.14 | 74.4 | |
| 147 | 1700 | 1.1102 | 1887.34 | 63.9 | |
| 148 | 2000 | 1.1221 | 2244.2 | 64 | |
| 149 | 2600 | 1.1132 | 2894.32 | 64.2 | |
| 150 | 3000 | 1.1339 | 3401.7 | 62.8 | |
| 151 | 3500 | 1.0861 | 3801.35 | 65.4 | |
| 152 | 4300 | 1.0872 | 4674.96 | 64.3 | |
| 153 | 5600 | 1.0834 | 6067.04 | 65.2 | |
| 154 | 5800 | 1.0893 | 6317.94 | 65.5 | |
| 155 | 5800 | 1.0991 | 6374.78 | 63.6 | |
| 156 | 5000 | 1.0901 | 5450.5 | 63.3 | |
| 157 | 9000 | 1.1791 | 10611.9 | 64.3 | |
| 158 | 9200 | 1.1796 | 10852.32 | 63.8 | |
| 159 | 6200 | 1.1302 | 7007.24 | 71.2 | |
| 160 | 6200 | 1.1229 | 6961.98 | 71.1 | |
| 161 | 10200 | 1.1065 | 11286.3 | 64 | |
| 162 | 10300 | 1.1121 | 11454.63 | 65.3 | |
| 163 | 10400 | 1.1118 | 11562.72 | 64.3 | |
| 164 | 9500 | 1.124 | 10678 | 67 | |
| 165 | 3800 | 1.1339 | 4308.82 | 63.8 | |
| 166 | 6000 | 1.1159 | 6695.4 | 60.3 | |
| 167 | 5600 | 1.0165 | 5692.4 | 77.6 | |
| 168 | 6700 | 1.0823 | 7251.41 | 75.2 | |
| 169 | 8800 | 1.0029 | 8825.52 | 80.4 | |
| 170 | 8500 | 1.0377 | 8820.45 | 79.5 | |

TABLE 3

| Sample No. | Q (3 GHz) | f | Qf (3 GHz) | $\epsilon'$ (3 GHz) |
|---|---|---|---|---|
| 23 | 3669 | 3.5075 | 12869.018 | 54.69 |
| 30 | 4104 | 3.301 | 13547.304 | 65.06 |
| 36 | 4080 | 3.283 | 13394.64 | 65.81 |
| 49 | 3981 | 3.3071 | 13165.565 | 64.3 |
| 50 | 3952 | 3.2981 | 13034.091 | |
| 55 | 3619 | 3.1984 | 11575.01 | 68.8 |
| 56 | 3988 | 3.315 | 13220.22 | 63.97 |
| 64 | 3808 | 3.3186 | 12637.229 | 63.85 |
| 65 | 3746 | 3.2934 | 12337.076 | 64.86 |
| 66 | 4175 | 3.4485 | 14397.488 | 59.07 |
| 67 | 3986 | 3.4196 | 13630.526 | 60.08 |
| 71 | 3807 | 3.3019 | 12570.333 | 64.52 |
| 72 | 4161 | 3.4473 | 14344.215 | 59.19 |
| 73 | 3726 | 3.2956 | 12279.406 | 64.89 |
| 75 | 4055 | 3.273 | 13272.015 | 65.84 |
| 76 | 3784 | 3.2418 | 12266.971 | 67.04 |
| 77 | 3548 | 3.1944 | 11333.731 | 69.1 |
| 78 | 3106 | 3.1836 | 9888.2616 | 69.64 |
| 79 | 4152 | 3.2889 | 13655.513 | 65.19 |
| 81 | 3890 | 3.2922 | 12806.658 | 65.06 |
| 82 | 3915 | 3.243 | 12696.345 | 67.01 |
| 83 | 3725 | 3.2149 | 11975.503 | 68.29 |
| 84 | 3319 | 3.1924 | 10595.576 | 69.25 |
| 85 | 4121 | 3.2855 | 13539.546 | 65.33 |
| 87 | 3941 | 3.2575 | 12837.808 | 66.46 |
| 88 | 3864 | 3.2943 | 12729.175 | 65.08 |
| 89 | 3594 | 3.2154 | 11556.148 | 68.36 |
| 90 | 3279 | 3.158 | 10355.082 | 70.9 |
| 97 | 3973 | 3.2739 | 13007.205 | 65.89 |
| 99 | 3955 | 3.2538 | 12868.779 | 66.7 |
| 100 | 3635 | 3.239 | 11773.765 | 67.35 |
| 101 | 3520 | 3.1777 | 11185.504 | 70.03 |
| 102 | 2975 | 3.1723 | 9437.5925 | 70.27 |
| 140 | 3776 | 3.1235 | 11794.336 | 72.7 |
| 141 | 3793 | 3.1231 | 11845.918 | 72.66 |

As described herein, in some radio-frequency (RF) applications such as low-frequency (700 MHz-1 GHz) microwave applications, materials with dielectric constant values greater than 60 and having Qf (product of Q and frequency f) values greater than 10,000 can be desirable. Among the non-limiting examples listed in Tables 1-3, a number of configurations can include such a combination of relatively high dielectric constant (e.g., greater than 60) and relatively high Qf (e.g., greater than 10,000) at or near such a low-frequency range of 700 MHz-1 GHz. Table 4 lists such configurations selected from the list of Tables 1-3.

TABLE 4

| Sample No. | Al % | Ba % | Sr % | La % | $CeO_2$ w % | $TiO_2$ w % | Qf (1 GHz) | $\epsilon'$ | $\tau_F$ |
|---|---|---|---|---|---|---|---|---|---|
| 9 | 75.1 | 24.8 | 0 | 0 | 0 | 0 | 10499 | | |
| 23 | 75.1 | 24.8 | 0 | 0 | 0.25 | 0 | 11538 | | -41.61 |
| 30 | 74.2 | 48.06 | 0 | 2.8 | 0.25 | 0 | 12982 | 63.1 | -62.53 |
| 32 | 24.98 | 24.91 | 0 | 8.89 | 0.75 | 0 | 10008 | | |
| 36 | 74.75 | 25.34 | 0 | 2.84 | 0 | 0 | 11923 | 66 | -61.19 |
| 37 | 49.68 | 24.91 | 0 | 5.82 | 0 | 0 | 10028 | | |
| 47 | 50.02 | 24.84 | 0 | 5 | 0 | 0 | 10506 | | |
| 48 | 50.02 | 24.84 | 0 | 10 | 0 | 0 | 10183 | | |
| 49 | 70.07 | 25 | 0 | 5 | 0 | 0 | 11880 | | -55.32 |
| 50 | 70.07 | 25 | 0 | 10 | 0 | 0 | 11536 | | -48.21 |
| 55 | 50.02 | 24.84 | 0 | 2.5 | 0 | 0 | 10717 | | -46.15 |
| 56 | 70.07 | 25 | 0 | 2.5 | 0 | 0 | 12139 | | -57.93 |
| 64 | 69.4 | 45.02 | 0 | 5 | 0 | 0 | 11192 | | -54.1 |
| 65 | 69.4 | 45.02 | 0 | 10 | 0 | 0 | 10929 | | -46.83 |
| 66 | 89.23 | 82.2 | 0 | 5 | 0 | 0 | 12259 | | -62.16 |
| 67 | 89.23 | 82.2 | 0 | 10 | 0 | 0 | 11647 | | -55.87 |
| 71 | 69.4 | 45.02 | 0 | 2.5 | 0 | 0 | 11296 | | -58.02 |
| 72 | 89.23 | 82.2 | 0 | 2.5 | 0 | 0 | 12693 | | -65.23 |
| 73 | 74.2 | 48 | 0 | 10 | 0 | 0 | 10657 | 65.5 | -50.34 |
| 75 | 74.2 | 0 | 48 | 10 | 0 | 0 | 10222 | 66.3 | -51.46 |
| 76 | 74.2 | 48 | 0 | 20 | 0 | 0 | 10354 | 67.8 | -32.96 |
| 79 | 74.75 | 25.35 | 0 | 10 | 0 | 0 | 11663 | 66 | -52.13 |
| 82 | 74.75 | 25.35 | 0 | 20 | 0 | 0 | 10682 | 67.5 | -36.93 |
| 85 | 70.06 | 25 | 0 | 10 | 0 | 0 | 11569 | 65.8 | -48.71 |
| 87 | 70.06 | 0 | 25 | 10 | 0 | 0 | 10201 | 67 | -51.36 |
| 88 | 70.06 | 25 | 0 | 20 | 0 | 0 | 10957 | 65.5 | -32.12 |
| 91 | 89.25 | 82.3 | 0 | 10 | 0 | 0 | 11870 | 61.2 | |
| 94 | 89.25 | 82.3 | 0 | 20 | 0 | 0 | 10160 | 61.9 | |
| 97 | 69.35 | 45 | 0 | 10 | 0 | 0 | 10912 | 66.9 | -47.17 |
| 99 | 69.35 | 0 | 45 | 10 | 0 | 0 | 10295 | 67.8 | -49.31 |
| 100 | 69.35 | 45 | 0 | 20 | 0 | 0 | 10205 | 68.1 | -29.03 |
| 105 | 50 | 12.5 | 0 | 5 | 0 | 0 | 10976 | 68.7 | |
| 107 | 50 | 25 | 0 | 5 | 0 | 0 | 10491 | 69.2 | |
| 119 | 66.67 | 25 | 0 | 5 | 0 | 0 | 11681 | 65.5 | |
| 121 | 66.67 | 50 | 0 | 5 | 0 | 0 | 10689 | 66.5 | |
| 140 | 25 | 25 | 0 | 0 | 0.067 | 8.333 | 10184 | 72.9 | -2.6 |
| 141 | 25 | 25 | 0 | 0 | 0.033 | 8.333 | 10142 | 73 | -1.86 |
| 157 | 70.06 | 25 | .3$GeO_2$ | 0 | .067$MnO_2$ | 0 | 10612 | 64.3 | |
| 158 | 70.06 | 25 | .3$GeO_2$ | 0 | 0.067 | 0 | 10852 | 63.8 | |
| 161 | 70.06 | 25 | 0 | 50$Nd_2O_3$ | 0.067 | 0 | 11286 | 64 | |
| 162 | 70.06 | 25 | 0 | 50$Nd_2O_3$ | .067$MnO_2$ | 0 | 11455 | 65.3 | |
| 163 | 70.06 | 25 | .3$GeO_2$ | 50$Nd_2O_3$ | 0.067 | 0 | 11563 | 64.3 | |
| 164 | 70.06 | 25 | .3$GeO_2$ | 50$Nd_2O_3$ | .067$MnO_2$ | 0 | 10678 | 67 | |

In Table 4, some of the listed samples do not have measured dielectric constant (∈') values. However, and as described herein in reference to Formula 1, tungsten bronze based materials, including the samples of Table 4, will tend to have dielectric constant values that are greater than 50.

Also in Table 4, some of the measured values of temperature coefficient of resonant frequency ($\tau_f$) are not listed. Among the samples whose $\tau_f$ values are listed, all of them are negative, mainly due to the Sm being the primary lanthanide. As described herein, such negative values of $\tau_f$ can be compensated by introduction of other lanthanides (e.g., Nd, Pr, Ce and La) having positive $\tau_f$ values.

For example, in Table 4, samples 56, 49, 50 and 88 all have the same 70% aluminum percent value and 25% barium percent value, but have increasing lanthanum content (La %) of 2.5%, 5%, 10% and 20%, respectively. For the same samples in the same order, one can see that the $\tau_f$ values (−57.93, −55.32, −48.21 and −32.12) become less negative as La % value increases.

In some embodiments, materials having one or more features as described herein can be implemented as microwave dielectric materials. As described herein, such microwave dielectric materials can be configured to have dielectric constant values greater than 60. When combined with improved Q performance and temperature compensation capability, such microwave dielectric materials can be desirable for RF applications such as Long-Term Evolution (LTE) applications in which filters can benefit from reduced sizes.

As described herein, substituting aluminum (Al) for at least some of the titanium (Ti) in the octahedral sites of a tungsten bronze material can yield some or all the foregoing desirable properties. Such substitutions can be effectuated in cost-effective manner.

As also described herein, lanthanides such as Sm and/or Nd can be utilized to achieve temperature compensated ceramic bodies. Table 5 lists additional examples of compositions that show, among others, how temperature coefficient of resonant frequency ($\tau_f$) can be adjusted by different combinations of Sm and Nd, and/or different substitutions of Ti with Al.

TABLE 5

| Sample | Density (g/cm³) | Dielectric Constant | $\tau_F$ | Qf (at 3 GHz) |
|---|---|---|---|---|
| $Ba_4Sm_{9.6}Ti_{17.2}Al_{.8}O_{54}$ | 5.62 | 66.33 | −50.38 | 11641 |
| $Ba_4Nd_{9.46667}Ti_{17.6}Al_{.4}O_{54}$ | 5.69 | 79.5 | 48.17 | 16073 |
| $Ba_4Nd_{9.6}Ti_{17.2}Al_{.8}O_{54}$ | 5.67 | 75.12 | 32.07 | 15298 |
| $Ba_4Nd_{9.7333}Ti_{16.8}Al_{1.2}O_{54}$ | 5.70 | 70.07 | 13.76 | 14635 |
| $Ba_4Nd_{9.8666}Ti_{16.4}Al_{1.6}O_{54}$ | 5.35 | 60.22 | 8.5 | 16028 |
| $Ba_4Nd_{9.0667}Y_{.4}Ti_{17.6}Al_{.4}O_{54}$ | 5.63 | 78.42 | 26.36 | 13936 |
| $Ba_4Nd_{8.8}Y_{.8}Ti_{17.2}Al_{.8}O_{54}$ | 5.57 | 72.3 | 5.85 | 14673 |
| $Ba_4Sm_{7.5733}Nd_{1.8933}Ti_{17.6}Al_{.4}O_{54}$ | 5.77 | 80.27 | 20.23 | 15653 |
| $Ba_4Sm_{5.76}Nd_{3.84}Y_{.8}Ti_{17.2}Al_{.8}O_{54}$ | 5.81 | 74.65 | −7.26 | 16534 |

At least some of the compositions listed in Table 5 are more specific examples of the samarium (Sm) based compositions described herein in reference to Formula 9 ($Ba_{4+x'}Sm_{(2/3)[14+0.5y-x']}Ti_{18-y}Al_yO_{54}$). In the example context of some of Sm being replaced with neodymium (Nd), such a formula can be expressed as $$Ba_4(Nd_{1-x}Sm_x)_{28/3+y/3}Ti_{18-y}Al_yO_{54}. \quad (10)$$

In Formula 10, x can be referred to as Sm content, and y can be referred to as Al content.

As described in reference to Table 5, temperature coefficient of resonant frequency ($\tau_f$) can be tuned by different combinations of Sm and Nd, and/or different substitutions of Ti with Al. Table 6 lists various examples of combinations of the Sm content (x) and the Al content (y) in reference to Formula 10.

TABLE 6

| Sample | Qf (at 1 GHz) | Qf (at 3 GHz) | ∈' |
|---|---|---|---|
| x = 0.2, y = 1.6 | 9796 | 15907 | 65.61 |
| x = 0.4, y = 1.2 | 10210 | 14448 | 70.02 |
| x = 0.6, y = 0.8 | 9436 | 13107 | 73.07 |
| x = 0.8, y = 0.4 | 7688 | 12021 | 76.46 |
| x = 0.6, y = 0.4 | 8824 | 13247 | 77.81 |
| x = 0.4, y = 0.8 | 10302 | 15395 | 73.96 |
| x = 0.2, y = 1.2 | 10151 | 15638 | 71.22 |
| x = 0.4, y = 0.4 | 9068 | 15593 | 70.38 |
| x = 0.2, y = 0.8 | 9154 | 14851 | 75.38 |
| x = 0.355, y = 0.68 | 10500 | 15321 | 75.2 |

For the samples listed in Table 6, their values of $\tau_f$ are generally in a range of −50 to 0 or 0 to 50. Accordingly, such samples can be utilized to estimate a plane in which $\tau_f$ is zero or close to zero, if such tuning is desired. For the example described in reference to Formula 10 and Table 6, such a $\tau_f=0$ plane can be along an approximate line between points (y≈0, x≈0.77) and (y≈1.8, x≈2) when y (Al content) is on the horizontal axis and x (Sm content) is on the vertical axis. In such a system, one can see that the example configuration of (x=0.355, y=0.68) (last example in Table 6) yields relatively high values of dielectric constant (75.2) and Qf (10500 at 1 GHz), while having $\tau_f$ that is tuned to a value close to zero. It will be understood that other systems having one or more features as described herein can also be tuned in a similar manner.

In some embodiments, Q value of a system can be adjusted (e.g., enhanced) by adjusting the Sm content (in the example context of the system of Formula 10), adding elements/compounds, and/or substituting elements/compounds. In the context of the example system of Formula 10, a more specific example can be represented by $Ba_4Nd_{6.16}Sm_{3.4}Ti_{17.32}Al_{0.68}O_{54}$. Examples of adjustments to such a system, and the resulting values of Qf, are listed in Table 7. If a Qf value greater than 10000 is desired, one can see that, for example, substituting $Ge_{0.1}$ for $Ti_{0.1}$ yields a relatively high Qf value of approximately 12300 (at 1 GHz).

TABLE 7

| $Ba_4Nd_{6.16}Sm_{3.4}Ti_{17.32}Al_{0.68}O_{54}$ | |
|---|---|
| x = 0.6 | Qf = 8467 (1 GHz) |
| x = 0.75 | Qf = 8993 (1 GHz) |
| 1% $Na_2O$ added | Qf = 9943 (1 GHz) |
| 1% $K_2O$ added | Qf = 7597 (1 GHz) |
| +2% $Ba_2Ti_9O_{20}$ | Qf = 9982 (1 GHz) |
| $Sn_{.05}$ for $Ti_{.05}$ | Qf = 10040 (1 GHz) |
| ($Ba_{3.6}Sr_{0.4}$) | Qf = 8958 (1 GHz) |
| $Mg_{.34}Ti_{.34}$ for $Al_{.68}$ | Qf = 8101 (1 GHz) |
| $Zn_{.34}Ti_{.34}$ for $Al_{.68}$ | Qf = 6396 (1 GHz) |
| $Ge_{.1}$ for $Ti_{.1}$ | Qf = 12300 (1 GHz) |
| $Fe_{.68}$ for $Al_{.68}$ | Qf = 4610 |
| $Mn_{.68}$ for $Al_{.68}$ | Qf = 8045 |
| $Mg_{.34}Ge_{.34}$ for $Al_{.68}$ | Qf = 8509 |
| $Zn_{.34}Ge_{.34}$ for $Al_{.68}$ | Qf = 10044 |

Figure 1:
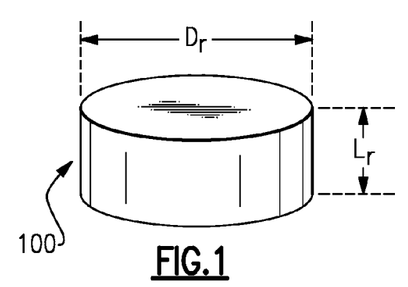
FIG. 1 shows that in some embodiments, a ceramic device such as a puck can include a material having one or more features as described herein.
Figure 2:
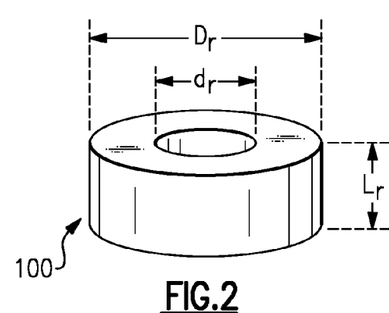
FIG. 2 shows that in some embodiments, a ceramic puck having one or more features as described herein can include a center aperture dimensioned to allow, for example, tuning of the ceramic puck when utilized as a microwave resonator.

FIGS. 1 and 2 show examples of microwave devices that can be formed from materials having one or more features as described herein. FIG. 1 shows that in some embodiments, a ceramic puck 100 can include a material as described herein so as to yield desirable properties such as a high dielectric constant (e.g., greater than 60) and a high Qf value (e.g., greater than 10,000) at relatively low frequencies (e.g., 700 MHz-1 GHz). Such a puck 100 can be implemented in a cylindrical shape having a diameter $D_r$ and a height $L_r$. Such a puck 100 can be utilized as a microwave resonator.

FIG. 2 shows that in some embodiments, a ceramic puck 100 having one or more features as described herein can include a center aperture dimensioned to allow, for example, tuning of the ceramic puck when utilized as a microwave resonator. The aperture is shown to have a diameter of $d_r$. The overall diameter $D_r$ and the height $L_r$ may or may not be the same as the solid ceramic puck counterpart.

Figure 3:
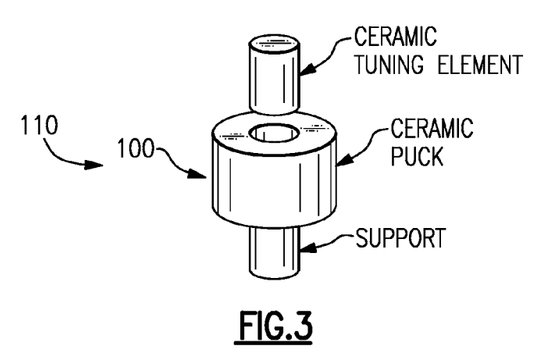
FIG. 3 shows an example of a tunable microwave resonator configuration.

FIG. 3 shows a tunable microwave resonator configuration 110. A ceramic puck 100 similar to the example of FIG. 2 is shown to be supported by a support structure. A ceramic tuning element can be dimensioned to fit within the aperture of the ceramic puck 100; and tuning can be achieved by the extent of insertion of the tuning element into the aperture.

Figure 4:
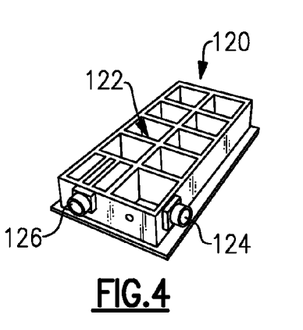
FIG. 4 shows an example of a cavity filter having a plurality of cavities arranged between radio-frequency (RF) ports.

FIG. 4 shows an example of a cavity filter 120 having a plurality of cavities 122 arranged between RF ports 124, 126. Each cavity 122 can be dimensioned to receive a resonator puck (e.g., 100 in FIGS. 1 and 2). Such a resonator puck may or may not be tunable. The resonators in their respective cavities can pass successively filtered RF signal through slots formed between neighboring cavities.

Figure 5:
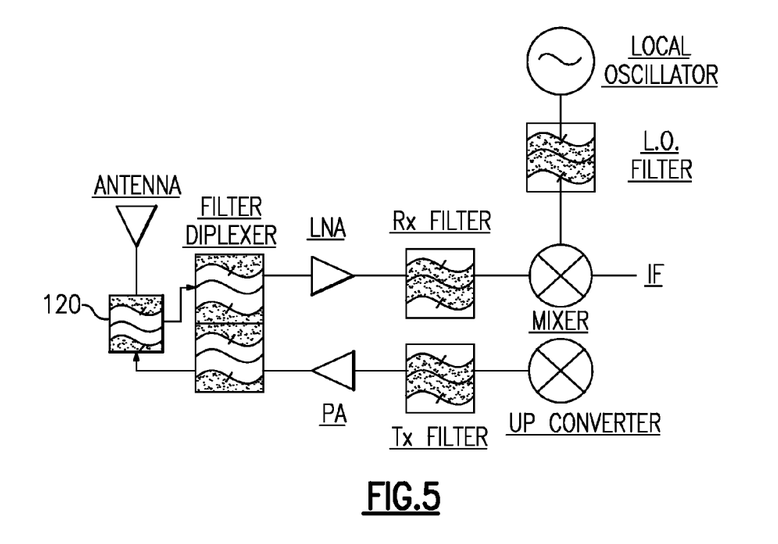
FIG. 5 shows an example of an RF system that can utilize one or more of the filter device of FIG. 4.

FIG. 5 shows an example of an RF system that can utilize one or more of the filter device 120 of FIG. 4. For example, the filter device of FIG. 4 can be implemented as a dielectric narrowband filter 120 between an antenna and a filter diplexer. The filter diplexer can be configured to provide a filtered signal to a low-noise amplifier (LNA) to be further processed by an Rx filter, a mixer that generates an intermediate-frequency (IF) with use of a local oscillator (L.O.) and an L.O. filter, and a baseband subsystem. The filter diplexer can also be configured to route an amplified RF signal from a power amplifier (PA) to the antenna for transmission. The power amplifier can be provided with an RF signal from an up converter passed through a Tx filter.

Figure 6:
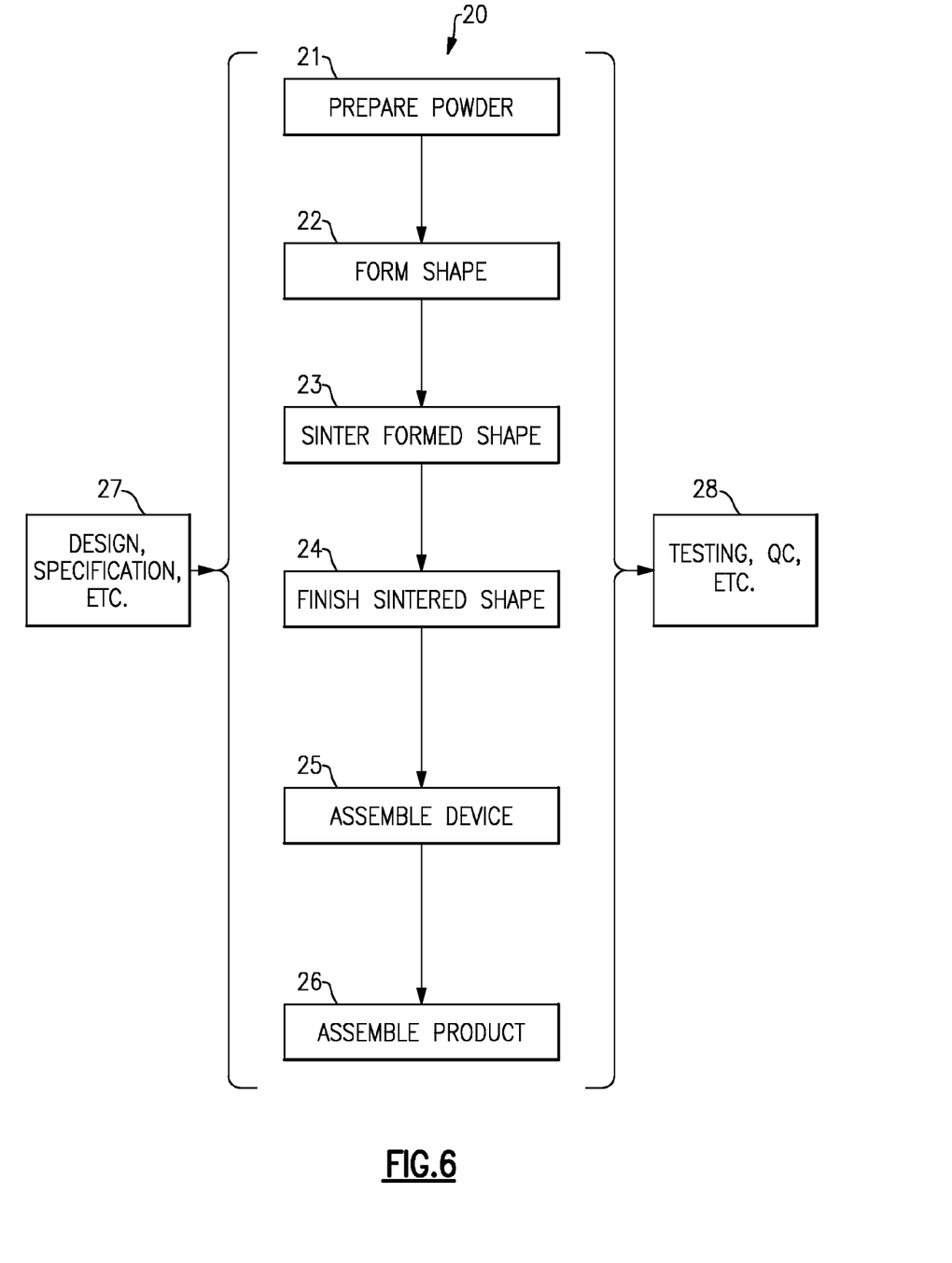
FIG. 6 shows a process that can be implemented to fabricate a ceramic material having one or more features as described herein.

FIGS. 6-10 show examples of how dielectric materials and/or devices having one or more features as described herein can be fabricated. FIG. 6 shows a process 20 that can be implemented to fabricate a ceramic material having one or more of the foregoing properties. In block 21, powder having one or more features as described herein can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

FIG. 6 further shows that some or all of the steps of the example process 20 can be based on a design, specification, etc. (collectively depicted as block 27). Similarly, some or all of the steps can include or be subjected to testing, quality control, etc. (collectively depicted as block 28).

Figure 7:
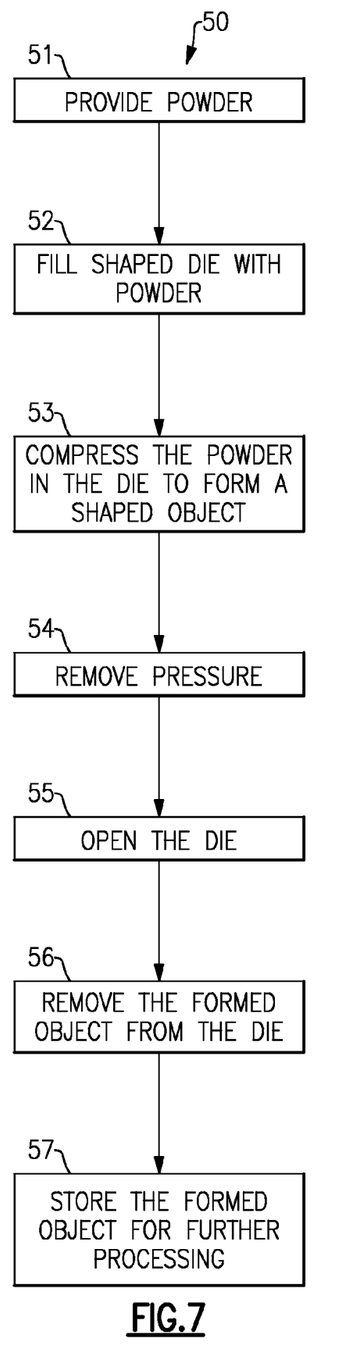
FIG. 7 shows a process that can be implemented to press-form a shaped object from a powder material prepared as described herein.
Figure 8:
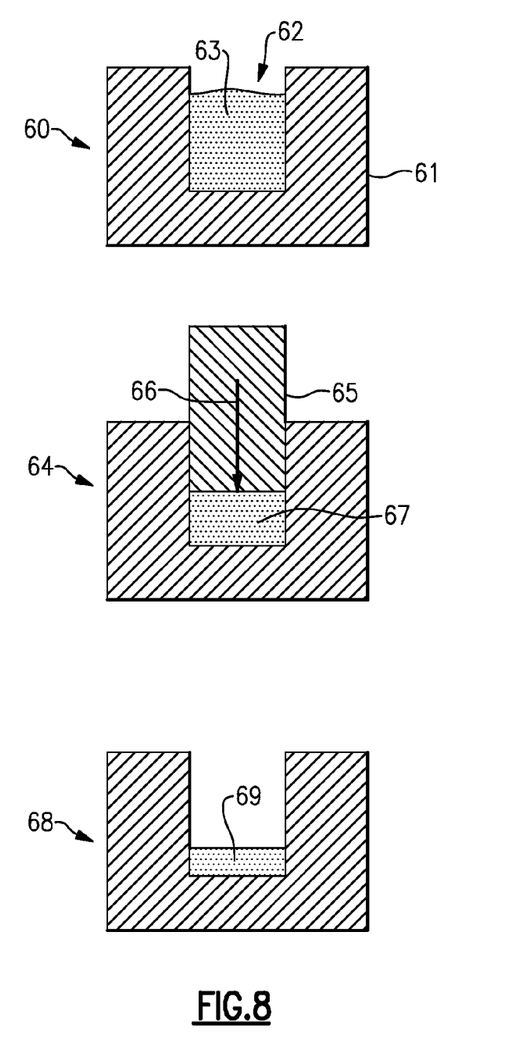
FIG. 8 shows example stages associated with the process of FIG. 7.

In some implementations, powder prepared in the powder preparation step (block 21) of FIG. 6 can be formed into different shapes by different forming techniques. By way of an example, FIG. 7 shows a process 50 that can be implemented to press-form a shaped object from a powder material prepared as described herein. In block 51 of FIG. 7, a powder as described herein can be provided. In block 52 of FIG. 7, a shaped die can be filled with a desired amount of the powder. In FIG. 8, configuration 60 shows the shaped die as 61 that defines a volume 62 dimensioned to receive the powder 63 and allow such power to be pressed. In block 53 of FIG. 7, the powder in the die can be compressed to form a shaped object. Configuration 64 of FIG. 8 shows the powder in an intermediate compacted form 67 as a piston 65 is pressed (arrow 66) into the volume 62 defined by the die 61. In block 54 of FIG. 7, pressure can be removed from the die. In block 55 of FIG. 7, the die (61 in FIG. 8) can be opened so as to expose the volume (62 in FIG. 8) by removing the piston (65 in FIG. 8). Configuration 68 of FIG. 8 shows the exposed volume (62) of the open die (61) thereby allowing the formed object 69 to be removed from the die. In block 56 of FIG. 7, the formed object (69 in FIG. 8) can be removed from the die (61 in FIG. 8). In block 57 of FIG. 7, the formed object can be stored for further processing.

Figure 9:
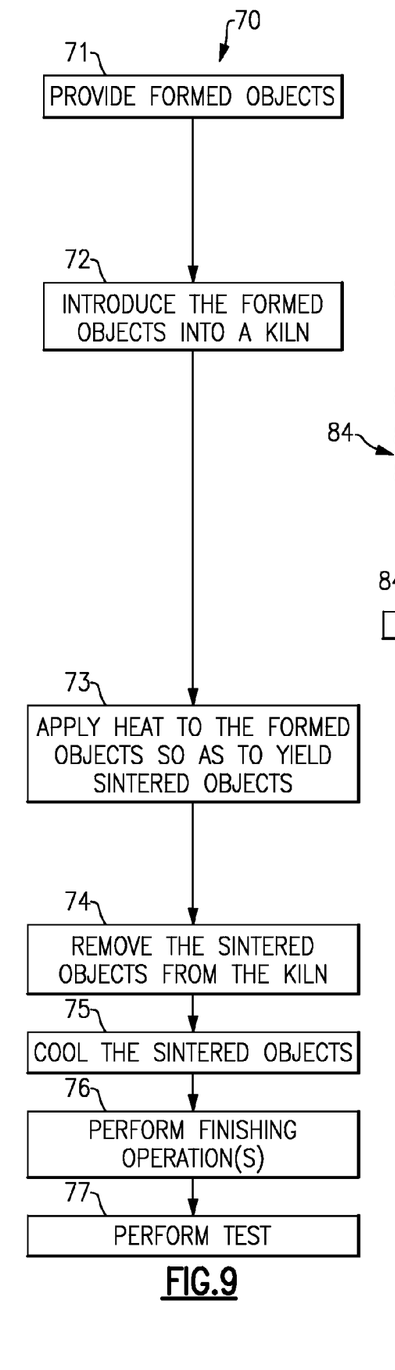
FIG. 9 shows a process that can be implemented to sinter formed objects having one or more features as described herein.
Figure 10:
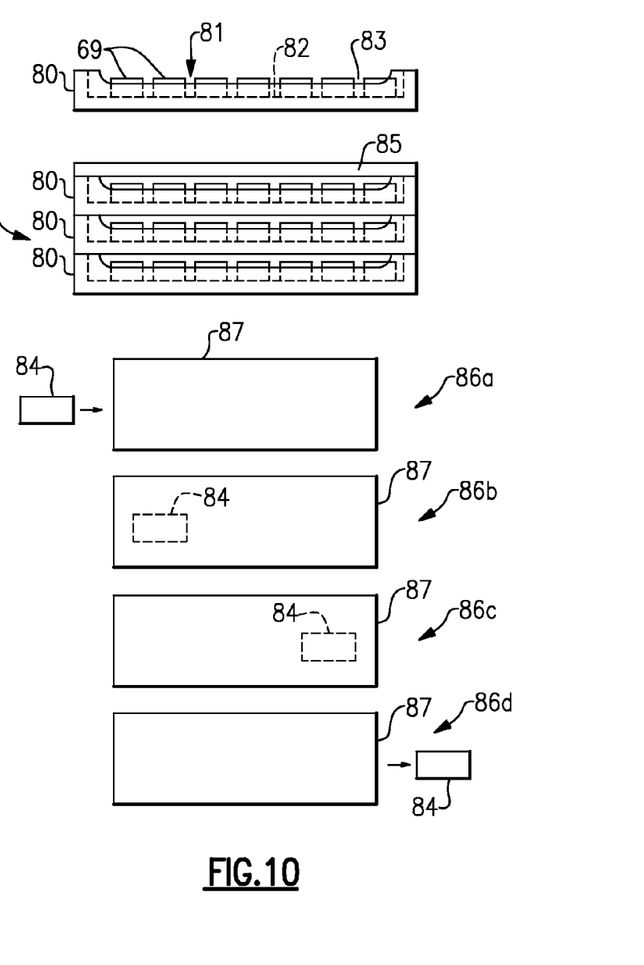
FIG. 10 shows example stages associated with the process of FIG. 9.

In some implementations, formed objects fabricated as described herein can be sintered to yield desirable physical properties as ceramic devices. FIG. 9 shows a process 70 that can be implemented to sinter such formed objects. In block 71, formed objects can be provided. In block 72, the formed objects can be introduced into a kiln. In FIG. 10, a plurality of formed objects 69 are shown to be loaded into a sintering tray 80. The example tray 80 is shown to define a recess 81 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 81, even when the trays are stacked together. FIG. 10 further shows a stack 84 of a plurality of loaded trays 80. A top cover 85 can be provided so that the objects loaded in the top tray generally experience similar sintering condition as those in lower trays.

In block 73 of FIG. 9, heat can be applied to the formed objects so as to yield sintered objects. Such application of heat can be achieved by use of a kiln. In block 74 of FIG. 9, the sintered objects can be removed from the kiln. In FIG. 10, the stack 84 having a plurality of loaded trays is depicted as being introduced into a kiln 87 (stage 86a). Such a stack can be moved through the kiln (stages 86b, 86c in FIG. 10) based on a desired time and temperature profile. In stage 86d of FIG. 10, the stack 84 is depicted as being removed from the kiln so as to be cooled.

In block 75 of FIG. 9, the sintered objects can be cooled. Such cooling can be based on a desired time and temperature profile. In block 76 of FIG. 9, the cooled objects can undergo one or more finishing operations. In block 77 of FIG. 9, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A composition comprising a material with a formula $Ba_{4+x}Sm_{(2/3)(14-x+0.5y)}Ti_{18-y}Al_yO_{54}$, the quantity y being in a range $0<y<2$, the quantity x being in a range $0<x<2-y$.

2. The composition of claim 1 wherein the quantity x is in a range $0<x<1-0.5y$ corresponding to barium content being in a range of 0% to 50%.

3. The composition of claim 1 wherein the quantity y is approximately 0.5 and the quantity x is in a range from approximately 0.01 to approximately 1.0.

4. The composition of claim 1 wherein the quantity y is approximately 1.0 and the quantity x is in a range from approximately 0.01 to approximately 0.5.

5. The composition of claim 1 wherein the quantity y is approximately 1.4 and the quantity x is in a range from approximately 0.01 to approximately 0.3.

6. The composition of claim 1 wherein at least some of the Sm is substituted by another lanthanide.

7. The composition of claim 6 wherein the other lanthanide includes La, Ce, Pr, Nd or Gd.

8. The composition of claim 6 wherein the other lanthanide substitutes up to approximately 50 atomic percent of the Sm.

9. The composition of claim 8 wherein the other lanthanide is La or Nd.

10. The composition of claim 1 wherein at least some of the Ba is substituted by Sr.

11. The composition of claim 1 further comprising a minor additive including manganese oxide, manganese carbonate, cerium oxide, copper oxide, germanium oxide, silica or gallium oxide.

12. The composition of claim 1 further comprising a high Q second phase material.

13. A dielectric resonator comprising a ceramic device configured as a microwave resonator, the ceramic device including a material with a formula $Ba_{4+x}Sm_{(2/3)(14-x+0.5y)}Ti_{18-y}Al_yO_{54}$, the quantity y being in a range $0<y<2$, the quantity x being in a range $0<x<2-y$.

14. The dielectric resonator of claim 13 wherein the material has a dielectric constant value that is greater than 60 for frequencies less than or equal to 1 GHz.

15. The dielectric resonator of claim 14 wherein the dielectric constant value is in a frequency range that is greater than or equal to 700 MHz and less than or equal to 1 GHz.

16. The dielectric resonator of claim 14 wherein the material has a Qf value that is greater than 10,000, the quantity Q being a quality factor, the quantity f being a frequency expressed in GHz.

17. A method for fabricating a tungsten bronze material, the method comprising:
in a material having rhombic (A1) sites, pentagonal (A2) sites, and titanium (Ti) in octahedral sites, substituting aluminum (Al) for at least some of the titanium (Ti) in the respective octahedral sites to provide a dielectric constant value greater than 60 and a Qf value greater than 10,000 at a frequency (f), with the quantity Q being a quality factor, and the quantity f being a frequency expressed in GHz and less than 1 GHz; and
adjusting contents of the A1 sites and the A2 sites to compensate for charge imbalance resulting from the aluminum substitution of titanium.

18. The method of claim 17 wherein the tungsten bronze material is represented by a formula $[A2]_4[A1]_{10}Ti_{18-y}Al_yO_{54}$.

19. The method of claim 18 wherein substantially all of the A2 sites are occupied by barium (Ba) and at least some of the A1 sites are occupied by samarium (Sm), such that the adjusting includes adding x formula unit of Ba and (2/3)x formula unit of Sm to the A1 sites.

20. The method of claim 19 further comprising substituting at least some of the samarium with another lanthanide (Ln) to provide a temperature coefficient of resonant frequency ($\tau_f$) that is less negative.

* * * * *